United States Patent
Ih

(10) Patent No.: US 9,395,836 B2
(45) Date of Patent: Jul. 19, 2016

(54) SYSTEM AND METHOD FOR REDUCING BORDERS OF A TOUCH SENSOR

(71) Applicant: Ronald Ih, Los Altos, CA (US)

(72) Inventor: Ronald Ih, Los Altos, CA (US)

(73) Assignee: Atmel Corporation, San Jose, CA (US)

( * ) Notice: Subject to any disclaimer, the term of this patent is extended or adjusted under 35 U.S.C. 154(b) by 334 days.

(21) Appl. No.: 13/964,603

(22) Filed: Aug. 12, 2013

(65) Prior Publication Data

US 2014/0092041 A1  Apr. 3, 2014

Related U.S. Application Data

(60) Provisional application No. 61/708,486, filed on Oct. 1, 2012.

(51) Int. Cl.
| | |
|---|---|
| H05K 5/00 | (2006.01) |
| H05K 7/00 | (2006.01) |
| G11B 33/02 | (2006.01) |
| G06F 3/041 | (2006.01) |
| G06F 3/044 | (2006.01) |

(52) U.S. Cl.
CPC .............. G06F 3/0412 (2013.01); G06F 3/044 (2013.01); G06F 2203/04103 (2013.01)

(58) Field of Classification Search
CPC .................................................. G02F 1/133308
USPC ....................................... 361/679.01–679.03
See application file for complete search history.

(56) References Cited

U.S. PATENT DOCUMENTS

| | | |
|---|---|---|
| 7,663,607 B2 | 2/2010 | Hotelling |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 2008/0223708 A1* | 9/2008 | Joo ..................... H04M 1/0202 200/600 |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |

(Continued)

FOREIGN PATENT DOCUMENTS

WO   WO 2012/129247   9/2012

OTHER PUBLICATIONS

U.S. Appl. No. 61/454,936, filed Mar. 21, 2011, Myers.

(Continued)

*Primary Examiner* — Jerry Wu
(74) *Attorney, Agent, or Firm* — Baker Botts L.L.P.

(57) ABSTRACT

In one embodiment, a method includes arranging a touch sensor over a first side of a display. The touch sensor comprising a first portion and a second portion. The first portion comprising a plurality of electrodes. The second portion comprising a plurality of tracks and a first plurality of connection pads. The method further includes folding the touch sensor around the display such that the second portion of the touch sensor is situated on a second side of the display. The second side of the display different than the first side of the display. Also, the method includes electrically coupling the first plurality of connection pads to a second plurality of connection pads. The second plurality of connection pads configured to be electrically coupled to a controller.

20 Claims, 6 Drawing Sheets

(56) References Cited

U.S. PATENT DOCUMENTS

2012/0243719 A1 9/2012 Franklin
2013/0076612 A1 3/2013 Myers

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

SYSTEM AND METHOD FOR REDUCING BORDERS OF A TOUCH SENSOR

PRIORITY

This application claims priority to U.S. Provisional Patent Application Ser. No. 61/708,486, titled "Narrow Border Touch Sensor," filed on Oct. 1, 2012.

TECHNICAL FIELD

This disclosure relates generally to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

Reference is now made to the following description taken in conjunction with the accompanying drawings, wherein like reference numbers represent like parts.

DESCRIPTION OF EXAMPLE EMBODIMENTS

Figure 1:
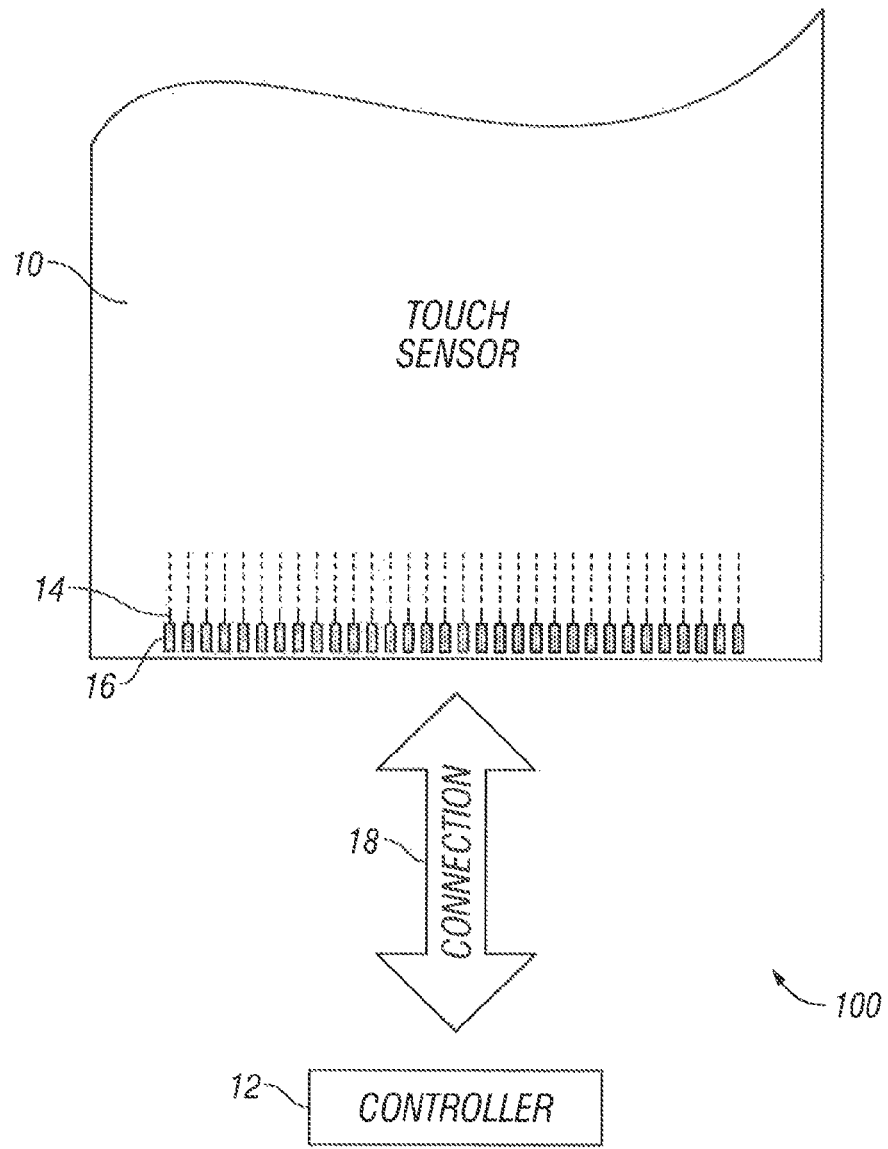
FIG. 1 is a block diagram of an example of a system that includes a touch sensor and a touch-sensor controller 12.

FIG. 1 is a block diagram of an illustrative system 100 including touch sensor 10 and touch-sensor controller 12. Touch sensor 10 and touch-sensor controller 12 may detect the presence and location of a touch or the proximity of an object within a touch-sensitive area of touch sensor 10. System 100 includes tracks 14 and connection pads 16. These serve to couple touch sensor 10 to touch-sensor controller 12 using connection 18. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. In some embodiments, one or more borders of touch sensor 10 may each be a portion of a side of touch sensor 10 that extends to an edge of touch sensor and that does not include electrodes but may include tracks 14 and/or connection pads 16. As will be discussed further below, touch sensor 10 may be folded so that one or more of such borders of touch sensor 10 can be reduced in size or substantially eliminated in various embodiments.

Herein, reference to a touch sensor may encompass both the touch sensor and its touch-sensor controller, where appropriate. Similarly, reference to a touch-sensor controller may encompass both the touch-sensor controller and its touch sensor, where appropriate. Further, a reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of a transparent material such as indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of one or more opaque materials such as fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. As an example and not by way of limitation, an electrode may be made of silver or other metallic particles (e.g., nanoparticles) suspended in a clear liquid (e.g., a clear ink). Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns. As an example, electrodes are substantially formed of metal lines that have a width of up to 15 microns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

In particular embodiments, the mechanical stack containing the substrate and the drive or sense electrodes may be formed within a display panel (thus forming an in-cell sensor) or on a display panel (thus forming an on-cell sensor). In an in-cell sensor, the display may be on the same substrate as the drive or sense electrodes. The display panel may be a liquid crystal display (LCD), a light-emitting diode (LED) display, an LED-backlight LCD, or other suitable electronic display and may be visible through the touch sensor 10 that provides the touch-sensitive area. Although this disclosure describes particular display types, this disclosure contemplates any suitable display types.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns or less and a width of approximately 10 microns or less. As another example, one or more portions of the conductive material may be silver or silver-based and similarly have a thickness of approximately 5 microns or less and a width of approximately 10 microns or less. This disclosure contemplates any suitable electrodes made of any suitable material.

There are a number of different types of touch sensors, such as (for example) resistive touch screens, surface acoustic wave touch screens, and capacitive touch screens. Herein, reference to a touch sensor may encompass a touch screen, and vice versa, where appropriate.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 microns or less. As another example, the conductive material of tracks 14 may be silver or silver-based and have a width of approximately 100 microns or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

In some embodiments, tracks 14 are placed on the substrate of touch sensor 10 such that they are not located at or near one or more edges of a device including touch sensor 10. Tracks 14 and connection pads 16 are placed on a portion of the substrate that is laminated or otherwise coupled to the back surface (or other surface that is not the front surface) of the device.

Connection pads 16 may be located along one or more edges of the substrate, outside the touch-sensitive area(s) of touch sensor 10. As described above, touch-sensor controller 12 may be on an FPC or other substrate which may be part of a device such as a display). Connection pads 16 may be made of the same material as tracks 14 and may be bonded to the FPC or other substrate using an anisotropic conductive film (ACF). Connection 18 may include conductive lines on the FPC or other substrate coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10. Connection pads located on the back surface of a display (e.g., display 250 discussed further below) of a device including touch sensor 10 may be coupled to connection 18 that connects the connection pads with touch-sensor controller 12. In particular embodiments, connection 18 may include one or more traces on an flexible printed circuit, one or more Inter-Integrated Circuit (I2C) connections, one or more universal serial bus (USB) connection, or other suitable connections.

Figure 2:
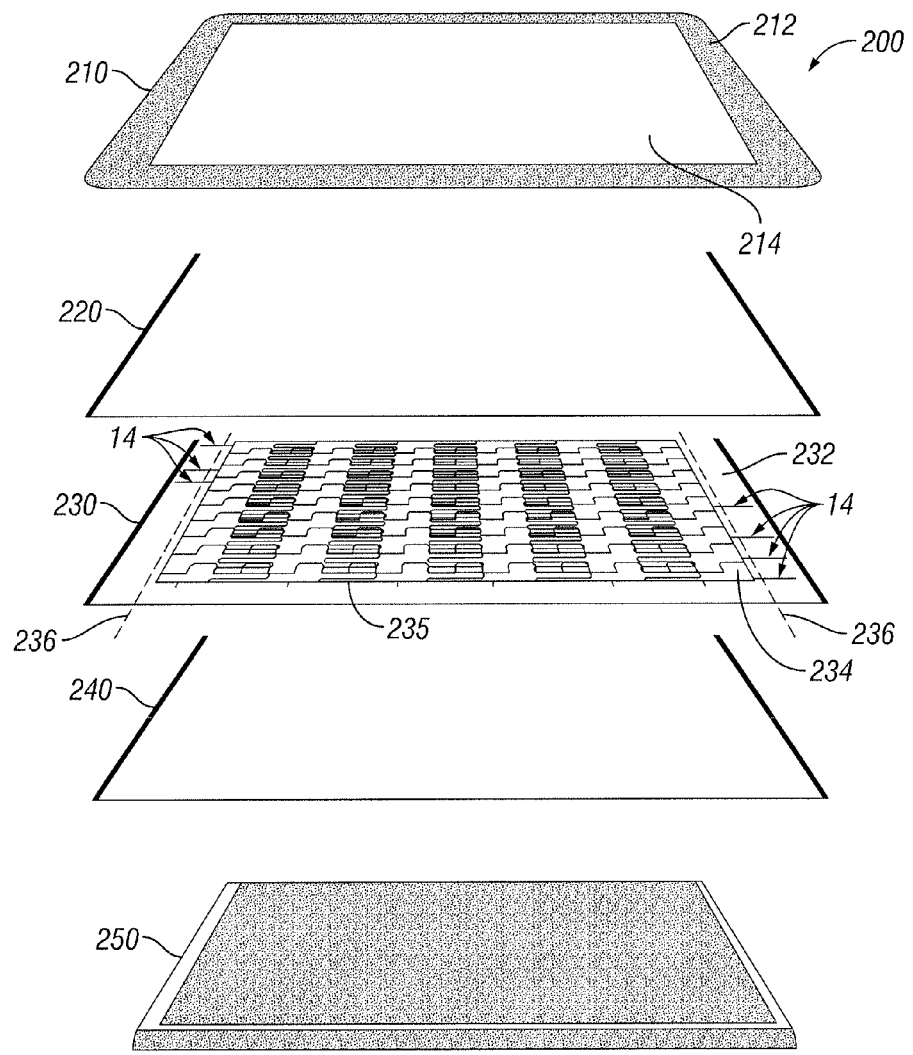
FIG. 2 is a diagram illustrating certain components of one embodiment of a touch screen device.

FIG. 2 is a diagram illustrating certain components of one embodiment of a touch screen device 200. Device 200 includes cover panel 210 which has a viewing portion 214 and a border 212. Device 200 also includes touch sensor 230 which has portion 232 that comprises tracks and/or connection pads and a portion 234 that comprises electrodes 235. Device 200 further includes display 250. Protective layers 220 and 240 may be included in device 200. Protective layer 220 is arranged between touch sensor 230 and cover panel 210 while protective layer 240 is arranged between touch sensor 230 and display 250.

In some embodiments, touch sensor 230 may be implemented using the techniques discussed above with respect to touch sensor 10 of FIG. 1. Protective layers 220 and 240 may be used to prevent touch sensor 230 from being damaged or having signals be negatively affected (e.g., shorted circuits or open circuits) by touch sensor 230 being joined to display 250 and touch panel 210. Protective layers 220 and 240 may be implemented using any suitable techniques (and, in some embodiments, may have separate implementations) such as the following examples: insulating sheet, rubber or plastic cover, OCA, flexible dielectric material, and insulating film (e.g., hard coat of polyethylene terephthalate).

In some embodiments, display 250 is configured to visually output information on a screen. Examples of implementations of display 250 include: cathode ray tube display, light-emitting diode display, electroluminescent display, electronic paper (e-ink), plasma display panel, liquid crystal display, high-performance addressing display, thin-film transistor display, and organic light-emitting diode display. Other suitable technologies may be used. In some embodiments, a frame or other housing may be used to house display 250.

In some embodiments, markings 236 indicate locations of touch sensor 230 that may be folded around display 250 (or a housing for display 250). Such folding may result in portion 232 no longer facing cover panel 210. In some embodiments, one or more tracks or portions of tracks may face cover panel 210 after touch sensor 230 has been folded along markings 236. This may result in the option of reducing or substantially eliminating border 212 in various embodiments. Other aspects of touch sensor 230 may be folded instead of, or in addition to, the aspects depicted in FIG. 2 in various embodiments. For example, as opposed to two sides of touch sensor 230 being folded as depicted in FIG. 2, fewer or more sides of touch sensor 230 may be folded. As another example, the aspect(s) of touch sensor 230 that may be folded may include electrodes as well as tracks and connection pads.

In some embodiments, touch screen device 200 provides a touch-sensitive interface to a user overlaid on a screen of device 200. Examples include smartphones, tablets, laptops, and monitors with touch-sensitive interfaces. Cover panel 210 may represent the aspect of device 200 that a user contacts (e.g., with a finger or a stylus). Viewing portion 214 and border 212 of cover panel 210 may be made of suitable materials such as glass or plastic. Viewing portion 214 is sufficiently clear for a user of device 200 to view content displayed by display 250 whereas border 212 of cover panel 210 may be opaque if desired. Cover panel 210 and touch sensor 230 may be arranged such that all or substantially all of portion 234 is under viewing portion 214 and such that all or substantially all of portion 234 is under border 212. As an example, such an arrangement may allow a user to determine what portion of device 200 is touch-sensitive because border 212 covers portion 232 of touch sensor 230 that are not touch-sensitive.

Figure 3A:
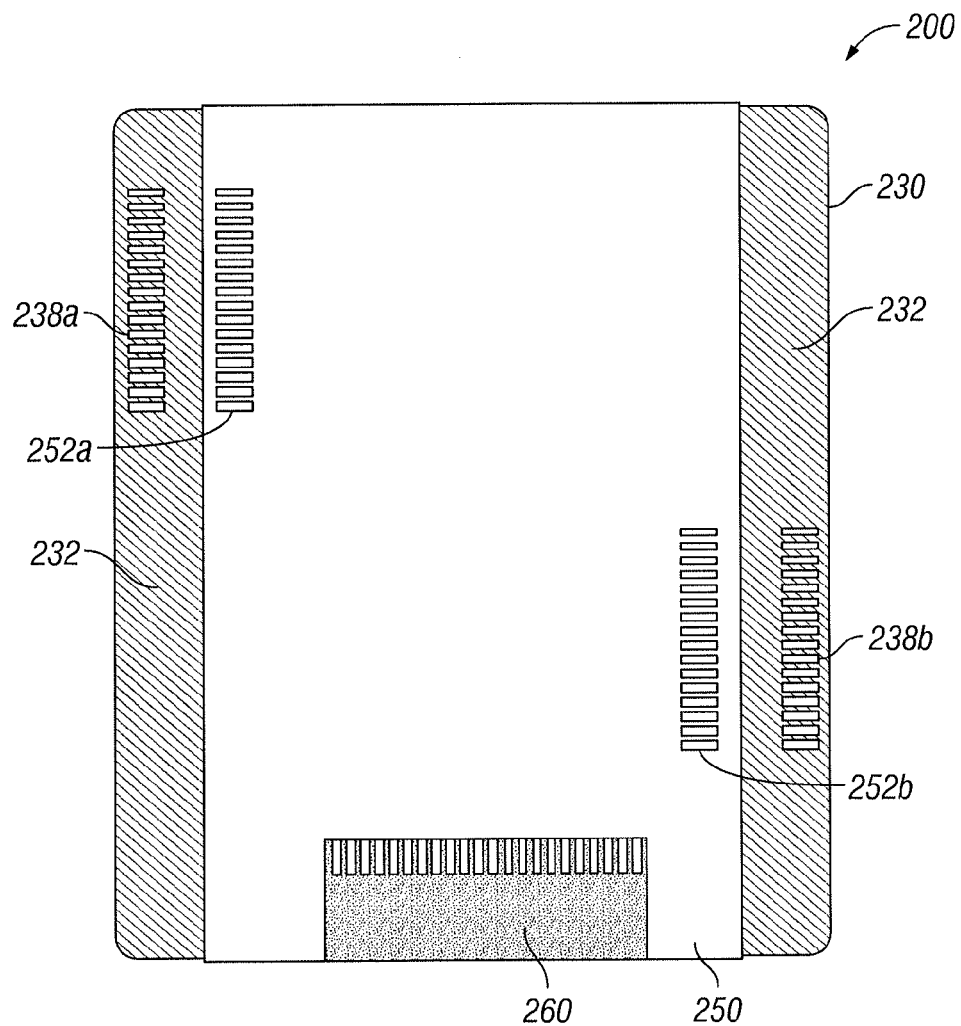
FIGS. 3A-3C illustrate various embodiments of folding aspects of a touch sensor around a display.
Figure 3B:
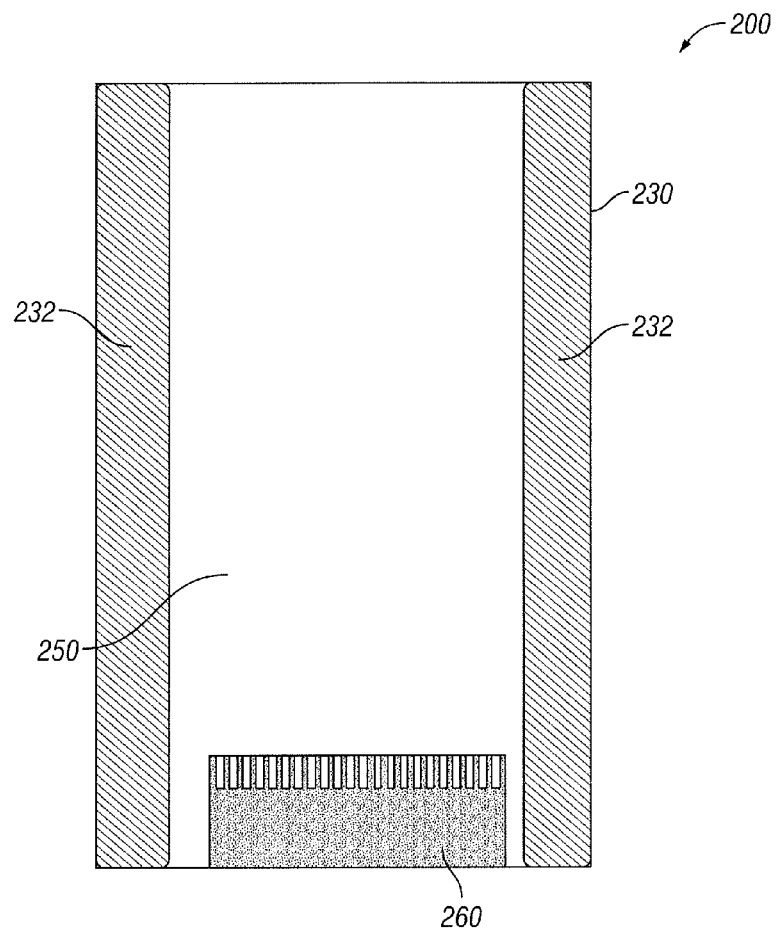

FIGS. 3A-3B illustrate one embodiment of folding aspects of touch sensor 230 around display 250 and provide a perspective of system 200 where display 250 is in the foreground and touch sensor 230 is behind display 250. The embodiment of FIG. 3A illustrates touch sensor 230 with connection pads 238a-b and display 250 (or a housing containing display 250) with connection pads 252a-b. The embodiment of FIG. 3A also illustrates connection 260 on display 250. Connection 260 serves to couple display 250 to other components of system 200 (e.g., a host controller) and may be implemented using connection pads and/or a flexible printed circuit. The discussion above regarding connection pads 16 of FIG. 1 provide examples of how connection pads 238a-b and 252a-b may be implemented.

Figure 3C:
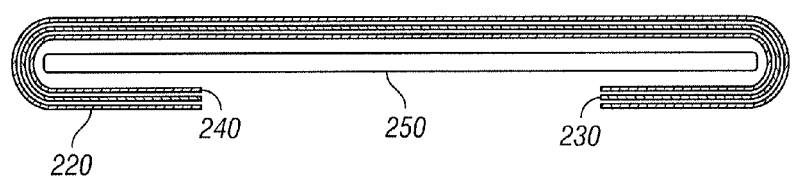

In some embodiments, folding touch sensor 230 around display 250 comprises coupling connection pads 238a with connection pads 252a and coupling connection pads 238b with connection pads 252b. This may result in allowing a controller (e.g., touch-sensor controller 12 of FIG. 1) to send signals to, and receive signals from, touch sensor 230. More or fewer connection pads that are configured to be coupled by folding touch sensor 230 around display 250 (such as connection pads 238a and 252a) may be present in system 200 in various embodiments. FIG. 3B illustrates one embodiment of system 200 after touch sensor 230 has been folded around display 250. FIG. 3C is a simplified, cross-sectional view of system 200 depicting sensor 230 and protective layers 220 and 240 folded around display 250.

Figure 4:
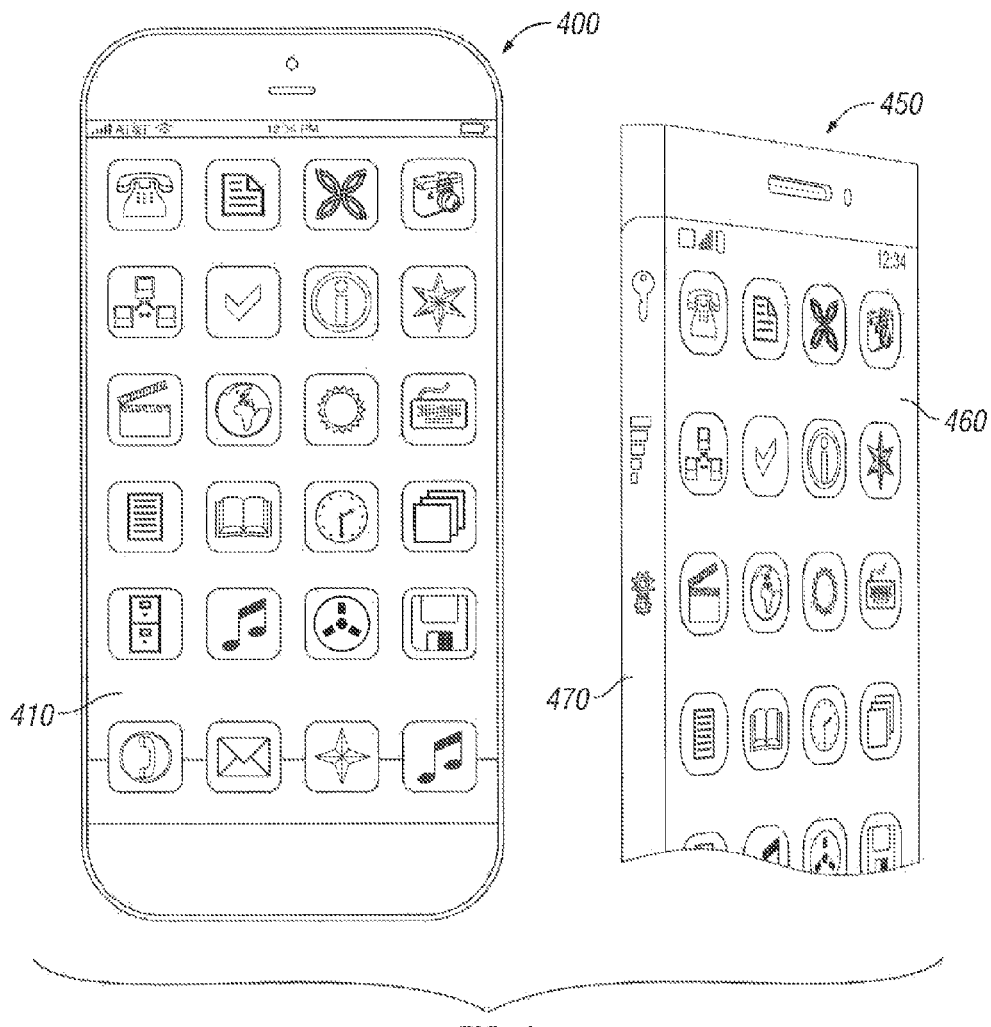
FIG. 4 illustrates examples of touch screen devices that have touch sensors folded around a display.

FIG. 4 illustrates examples of touch screen devices 400 and 450 (e.g., smartphones or tablet computers) that have touch sensors folded around a display. Touch screen device 400 has a touch-sensitive screen 410 that a user can touch (e.g., with a finger or a stylus) to interact with the touch screen device 400. A touch sensor (e.g., touch sensor 230) of touch screen device 400 is folded around a display (e.g., display 250) of touch screen device 400. An example of an advantage of touch screen device 400 is that touch-sensitive screen 410 spans from one edge to another edge of touch screen device 400.

In some embodiments, touch screen device 450 has a touch-sensitive screen 460 that a user can touch (e.g., with a finger or a stylus) to interact with the touch screen device 450. A touch sensor (e.g., touch sensor 230) of touch screen device 450 is folded around a display (e.g., display 250) of touch screen device 450 such that electrodes of the touch sensor are present on more than one side of the display. As an example, this can result in touch screen device 450 having more than one surface that is touch sensitive; this is depicted in FIG. 4 as side 460 of touch screen device 450 including a touch-sensitive screen spanning from one edge to another edge of touch screen device 450 as well as side 470 including a touch-sensitive interface. As another example, the touch sensor of touch screen device 450 may be folded such that side 460 includes a touch-sensitive interface as well as the side opposite side 460 (e.g., a back of touch screen device 450).

Figure 5:
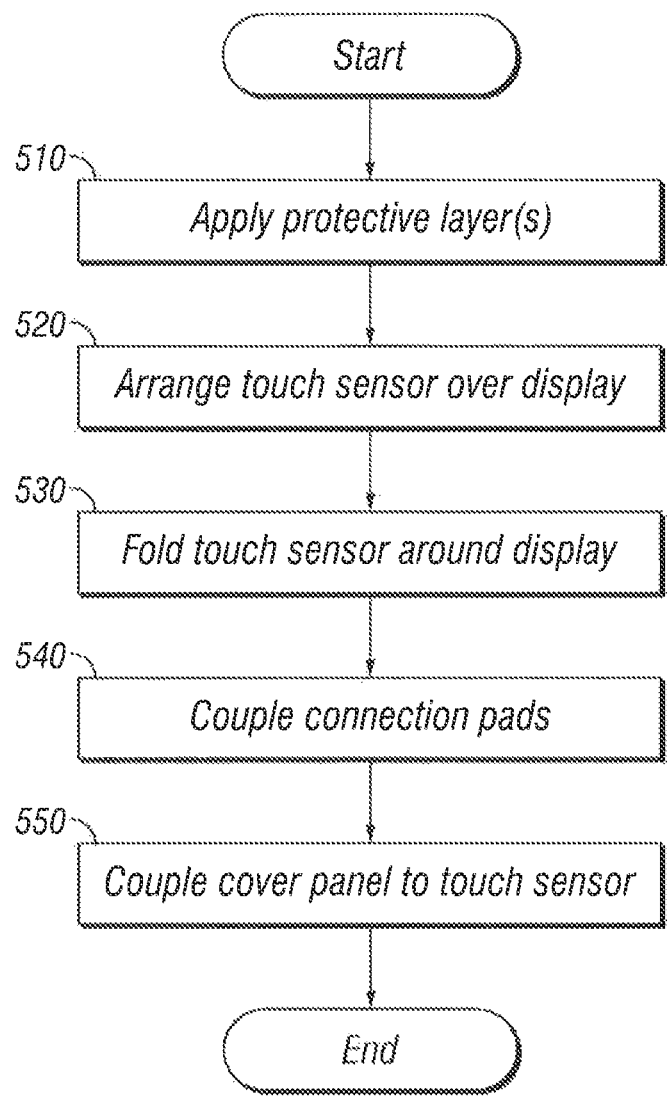
FIG. 5 illustrates an example of a method for folding a touch sensor around a display.

FIG. 5 illustrates an example of a method for folding a touch sensor around a display. The steps discussed below regarding FIG. 5 may be used in the systems described above with respect to FIGS. 1-4. The discussion of the steps of FIG. 5 below may reference components of FIGS. 1-4 but other suitable components disclosure may be involved with the steps of FIG. 5. Some embodiments may repeat or omit certain steps of the method of FIG. 5 as well as add steps to the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order including performing any suitable steps simultaneously. Furthermore, although this disclosure describes and illustrates particular components, devices, or systems carrying out particular steps of the method of FIG. 5, this disclosure contemplates any suitable combination of any suitable components, devices, or systems carrying out any suitable steps of any of the methods of FIG. 5.

At step 510, in some embodiments, one or more protective layers (e.g., protective layers 220 and 240) may be applied to touch sensor 230. Protective layers may be laminated (or otherwise coupled) to the top or bottom of touch sensor 230. In some embodiments, the protective layer(s) may serve to protect electrodes of touch sensor 230 during subsequent steps of the method of FIG. 5 or during operation of a device including touch sensor 230. The protective layer(s) may be any suitable material such as PET, OCA, or other flexible dielectric material.

At step 520, in some embodiments, touch sensor 230 is arranged over display 250. As discussed above, touch sensor 230 and display 250 may be used in a device that provides a touch interface to a user. Electrodes of touch sensor 230 may be used to detect touches by a user of a device incorporating touch sensor 230 and display 250. Touch sensor 230 may be arranged between a user and display 250 such that a user may interact using touches with an interface presented by display 250.

At step 530, in some embodiments, touch sensor 230 may be folded around display 250. For example, touch sensor 230 may be bent to wrap around display 250 (or a housing of display 250). One or more portions of touch sensor 230 may be folded around display 250. Such portion(s) may include electrodes, tracks, and connection pads. In some embodiments, touch sensor 230 may include materials impervious to bending (e.g., the materials can be bent and still transmit electrical signals), such as fine lines of metal or other conductive material (examples of which are discussed above with respect to FIG. 1). Folding touch sensor 230 around display 250 may cause connection pads of touch sensor 230 to be facing connection pads of display 250. Various embodiments may simplify single-sided sensor designs with large numbers of tracks because signal lines can be directly routed off each of the four edges (or other suitable number of edges) of touch sensor 230 and bonded to connection pads on the back (or other surface that is not the front surface) of display 250 using the folding techniques of this step.

At step 540, in some embodiments, connection pads of touch sensor 230 are coupled to connection pads of display 250. For example, they may be bonded using suitable techniques. This may allow electrical signals from touch sensor 230 to travel to the connection pads of display 250. As an example, the connection pads of display 250 bonded at this step may allow for a touch-sensor controller (e.g., touch-sensor controller 12 of FIG. 1) to send signals and receive signals from touch sensor 230.

At step 550, in some embodiments, cover panel 210 is coupled to touch sensor 230. As an example, cover panel 210 may be adhered using glue, resins, polymers, or other suitable techniques. Protective layer 220 may be present between cover panel 210 and touch sensor 230. In some embodiments, cover panel 210 may be implemented without the use of a curved cover panel. For example, standard glass, GORILLA glass, or other glass with generally straight surfaces may be used. The method may end after step 550 is performed.

In some embodiments, the techniques discussed above with respect to FIGS. 1-5 may provide one or more advantages. For example, Various embodiments provide a touch sensor with at least one surface (e.g., the front surface through which a display is shown) having narrow sensor borders or no sensor borders. In some embodiments, protective layers may be laminated (or otherwise coupled) to the top or bottom of the substrate of a touch sensor during manufacture to protect the electrodes during subsequent processing of the touch sensor (e.g., while bending or wrapping the touch sensor around the surfaces of a device). As another example, a border of the edge of the front surface of a touch screen device that is not touch-sensitive may be very narrow or non-existent. In some embodiments, the width of the border is between 0 and 150 microns. Another example of an advantage involves a device that is edgeless and not limited by track width or spacing, bond pad sizes, or cut tolerances.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
arranging a touch sensor over a first side of a display, the touch sensor comprising a first portion and a second portion, the first portion comprising a plurality of electrodes, the second portion comprising a plurality of tracks and a first plurality of connection pads;
folding the touch sensor around the display such that the second portion of the touch sensor is situated on a second side of the display, the second side of the display opposite to the first side of the display; and
electrically coupling, at least by folding the touch sensor around the display, the first plurality of connection pads to a second plurality of connection pads situated on the second side of the display, the second plurality of connection pads configured to be electrically coupled to a controller.

2. The method of claim 1, further comprising:
applying a first protective layer to a first side of the touch sensor; and
applying a second protective layer to a second side of the touch sensor.

3. The method of claim 1, wherein:
the second portion of the touch sensor further comprises a second plurality of electrodes;
folding the touch sensor around the display comprises folding the touch sensor around the display such that the second plurality of electrodes are situated on the second side of the display.

4. The method of claim 1, wherein:
the plurality of electrodes are substantially formed of metal lines that have a width of up to 15 microns; and
the plurality of tracks have a width of up to 100 microns.

5. The method of claim 1, wherein folding the touch sensor around the display comprises folding the touch sensor around the display such that a distance between a first edge of the touch sensor and an electrode of the plurality of electrodes closest to the first edge is less than 150 microns.

6. The method of claim 1, wherein the second plurality of connection pads are situated on the second side of the display.

7. The method of claim 1, wherein folding the touch sensor around the display such that the second portion of the touch sensor is situated on the second side of the display comprises folding the touch sensor around the display such that a first track of the touch sensor is on a side of the touch sensor arranged over the first side of the display.

8. The method of claim 1, further comprising coupling the touch sensor to a cover panel, the touch sensor situated between the cover panel and the display.

9. An apparatus comprising:
a display;
a touch sensor arranged over a first side of a display, the touch sensor comprising a first portion and a second portion, the first portion comprising a plurality of electrodes, the second portion comprising a plurality of tracks and a first plurality of connection pads;
wherein the touch sensor is folded around the display such that the second portion of the touch sensor is situated on a second side of the display, the second side of the display opposite to the first side of the display; and
a second plurality of connection pads situated on the second side of the display, the second plurality of connection pads electrically coupled to the first plurality of connection pads at least by folding the touch sensor around the display, the second plurality of connection pads configured to be electrically coupled to a controller.

10. The apparatus of claim 9, wherein:
the second portion of the touch sensor further comprises a second plurality of electrodes;
the touch sensor is folded around the display such that the second plurality of electrodes are situated on the second side of the display.

11. The apparatus of claim 9, wherein:
the plurality of electrodes are substantially formed of metal lines that have a width of up to 15 microns; and
the plurality of tracks have a width of up to 100 microns.

12. The apparatus of claim 9, wherein the touch sensor is folded around the display such that a distance between a first edge of the touch sensor and an electrode of the plurality of electrodes closest to the first edge is less than 150 microns.

13. The apparatus of claim 9, wherein the second plurality of connection pads is situated on the second side of the display.

14. The apparatus of claim 9, wherein the touch sensor is folded around the display such that a first track of the touch sensor is on a side of the touch sensor arranged over the first side of the display.

15. The apparatus of claim 9, further comprising a cover panel, the cover panel coupled to the touch sensor, the touch sensor situated between the cover panel and the display.

16. The apparatus of claim 9, further comprising:
a first protective layer applied to a first side of the touch sensor; and
a second protective layer applied to a second side of the touch sensor.

17. An apparatus comprising:
a display;
a touch sensor arranged over a first side of a display, the touch sensor comprising a first portion and a second portion, the first portion comprising a plurality of electrodes, the second portion comprising a plurality of tracks and a first plurality of connection pads;
wherein the touch sensor is folded around the display such that the second portion of the touch sensor is situated on a second side of the display, the second side of the display opposite to the first side of the display;
a first protective layer applied to a first side of the touch sensor;
a second protective layer applied to a second side of the touch sensor;
a second plurality of connection pads situated on the second side of the display, the second plurality of connection pads electrically coupled to the first plurality of connection pads at least by folding the touch sensor around the display, the second plurality of connection pads configured to be electrically coupled to a controller; and
a cover panel, the cover panel coupled to the touch sensor, the touch sensor situated between the cover panel and the display.

18. The apparatus of claim 17, wherein:
the plurality of electrodes are substantially formed of metal lines that have a width of up to 15 microns; and
the plurality of tracks have a width of up to 100 microns.

19. The apparatus of claim 17, wherein the touch sensor is folded around the display such that a distance between a first edge of the touch sensor and an electrode of the plurality of electrodes closest to the first edge is less than 150 microns.

20. The apparatus of claim 17, wherein:
the second portion of the touch sensor further comprises a second plurality of electrodes;
the touch sensor is folded around the display such that the second plurality of electrodes are situated on the second side of the display.

\* \* \* \* \*